(12) United States Patent
Murphy et al.

(10) Patent No.: US 7,433,267 B2
(45) Date of Patent: Oct. 7, 2008

(54) TWO WIRE RESISTIVE SENSOR

(75) Inventors: Gregory P. Murphy, Janesville, WI (US); Lawrence B. Reimer, Janesville, WI (US)

(73) Assignee: SSI Technologies, Inc., Janesville, WI (US)

( * ) Notice: Subject to any disclaimer, the term of this patent is extended or adjusted under 35 U.S.C. 154(b) by 696 days.

(21) Appl. No.: 11/010,921

(22) Filed: Dec. 13, 2004

(65) Prior Publication Data

US 2006/0125488 A1 Jun. 15, 2006

(51) Int. Cl.
*G01S 15/00* (2006.01)
(52) U.S. Cl. .................................. 367/135; 367/908
(58) Field of Classification Search ................ 367/135, 367/99, 908; 702/166, 159, 155
See application file for complete search history.

(56) References Cited

U.S. PATENT DOCUMENTS

| 4,398,325 | A | 8/1983 | Piaget et al. |
|---|---|---|---|
| 4,564,980 | A | 1/1986 | Diepers |
| 4,613,848 | A | 9/1986 | Watkins |
| 4,747,192 | A | 5/1988 | Rokurota |
| 5,081,411 | A | 1/1992 | Walker |
| 5,488,307 | A | 1/1996 | Plott |
| 5,623,172 | A | 4/1997 | Zaretsky |
| 5,786,644 | A | 7/1998 | Zaretsky |
| 6,437,581 | B1 | 8/2002 | Blossfeld |
| 6,717,416 | B2 | 4/2004 | Koernle et al. |
| 2002/0135273 | A1 | 9/2002 | Mauchamp et al. |
| 2006/0125488 | A1* | 6/2006 | Murphy et al. .............. 324/537 |
| 2007/0203668 | A1* | 8/2007 | Reimer et al. .............. 702/159 |

FOREIGN PATENT DOCUMENTS

DE 1005044613 A * 6/2006

* cited by examiner

*Primary Examiner*—Dan Pihulic
(74) *Attorney, Agent, or Firm*—Michael Best & Friedrich LLP

(57) ABSTRACT

A circuit with two terminals that receive an input current. The circuit includes a sensor, and a controller to generate a modulated signal. The circuit also includes a flyback circuit that receives the modulated signal. The flyback circuit generates a first output voltage based on the modulated signal, shunts or redistributes at least a portion of the input current, and enables the controller to regulate the input current in proportion to the modulated signal.

38 Claims, 3 Drawing Sheets

TWO WIRE RESISTIVE SENSOR

BACKGROUND

Embodiments of the invention relate to sensing devices, and particularly to two-wire sensing devices.

Level sensing devices, such as fuel level sensors and the like, are often connected to a gauge, which provides a visual indication of the amount of liquid or material in a tank, hopper, or similar container. A typical fluid level sensor includes a float that floats or rests on top of the fluid or material in a tank and a potentiometer. The potentiometer generally includes a tap that is mechanically connected to the float. When the float moves (such as due to a change in the level of the fluid in a tank) the tap moves. Movement of the tap causes a change in the resistance of the potentiometer. The potentiometer is connected in a circuit such that the change in resistance causes a change in the magnitude of the current in at least part of the circuit. The change in current magnitude changes, for example, the position of a needle in an analog gauge. Thus, as the fluid level changes, the reading of the gauge changes.

SUMMARY

While existing float sensors are functional, they are not as reliable as desired. Accordingly, there is a need for an improved level sensor.

As noted, existing level sensors are connected in a circuit, which is typically a two wire circuit. The level sensor appears as a resistive load to the remainder of the circuit. Thus, while improved level sensors are desired, it is also desirable that new sensors be compatible with existing two-wire installations.

In one embodiment, the invention provides a two-wire circuit that can emulate a two-wire, resistive sensor. Such a circuit is generally compatible with other existing components in the circuit, such as a gauge. Accordingly, it is relatively easy to retrofit embodiments of the invention in existing vehicles, devices, facilities, etc.

In another embodiment, the invention provides a circuit. The circuit includes a sensor, and a controller to generate a modulated signal. The circuit also includes a flyback circuit that receives the modulated signal. The flyback circuit generates a first output voltage based on the modulated signal, shunts at least a portion of the input current, and enables the controller to regulate the input current in proportion to the modulated signal.

In another embodiment, the invention provides a circuit that has two terminals. The circuit includes a means for receiving a current signal, a means for sensing, and a means for generating a modulated signal. The circuit also includes a means for shunting at least a portion of the current signal, for enabling the means for generating the modulated signal to regulate the current signal in proportion to the modulated signal.

In yet another embodiment, the invention provides a method for operating a two-wire resistive sensor that has two terminals and a processor. The method includes receiving a current signal at the two terminals, and generating a modulated signal at the processor. The method also includes shunting at least a portion of the current signal, and regulating the current signal in proportion to the modulated signal.

In yet another embodiment, the invention provides a method of emulating a two-wire resistive sensor that has two terminals. The two terminals are configured to receive an input current. The method includes sensing a distance, and generating a modulated signal based on the distance. The method also includes shunting at least a portion of the input current based on the modulated signal, and regulating the input current in proportion to the modulated signal.

In yet another embodiment, the invention provides a circuit comprising a sensor and a controller that is coupled to the sensor to generate a modulated signal. The circuit also includes a flyback circuit that is coupled to the controller to receive the modulated signal. The flyback circuit generates a first output voltage based on the modulated signal, and powers the sensor with the first output voltage. The circuit also includes a regulator to produce a second output voltage based on the first output voltage, and to power the controller with the second output voltage.

Other features and advantages of the invention will become apparent to those skilled in the art upon review of the following detailed description, claims, and drawings.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. In addition, the terms "connected" and "coupled" and variations thereof are not restricted to physical or mechanical connections or couplings.

DETAILED DESCRIPTION

Figure 1:
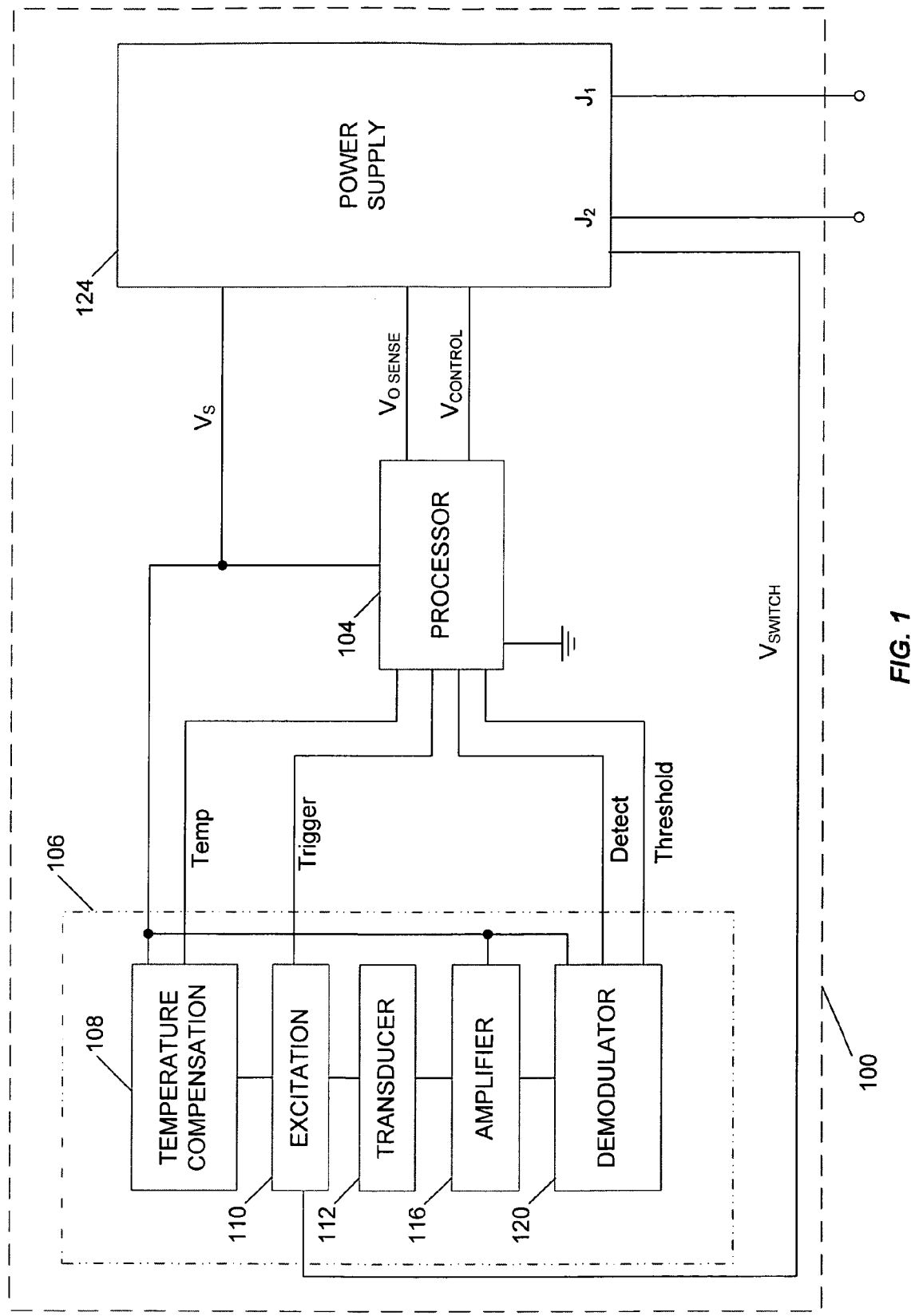
FIG. 1 is a block diagram of a two-wire sensor system.

FIG. 1 shows an exemplary two-wire sensor system 100 that can be used to emulate an analog two-wire, resistive level sensor. The two-wire sensor system 100 includes a controller or a processor 104 that is coupled to a driving module 106. The processor 104 can be a microprocessor, a micro-controller, an application-specific-integrated-circuit ("ASIC"), and the like. In some embodiments, the processor 104 can include a memory that stores software and data used in the two-wire sensor system 100. The driving module 106 sends a temperature compensation signal from a temperature compensation module 108 to the processor 104. The driving module 106 also includes an excitation module 110 that drives a transducer module 112 to sense phenomena such as fluid levels. The sensed phenomenon is subsequently amplified at an amplifier module 116, and modulated at a demodulating module 120 to obtain a modulated signal. A power supply module 124 then receives the modulated signal from the driving module 106 via the processor 104. Two regulated power signals are then generated by the power supply module 124 based on the modulated signal received. The details of how the system 100 operates are discussed hereinafter.

Figure 2:
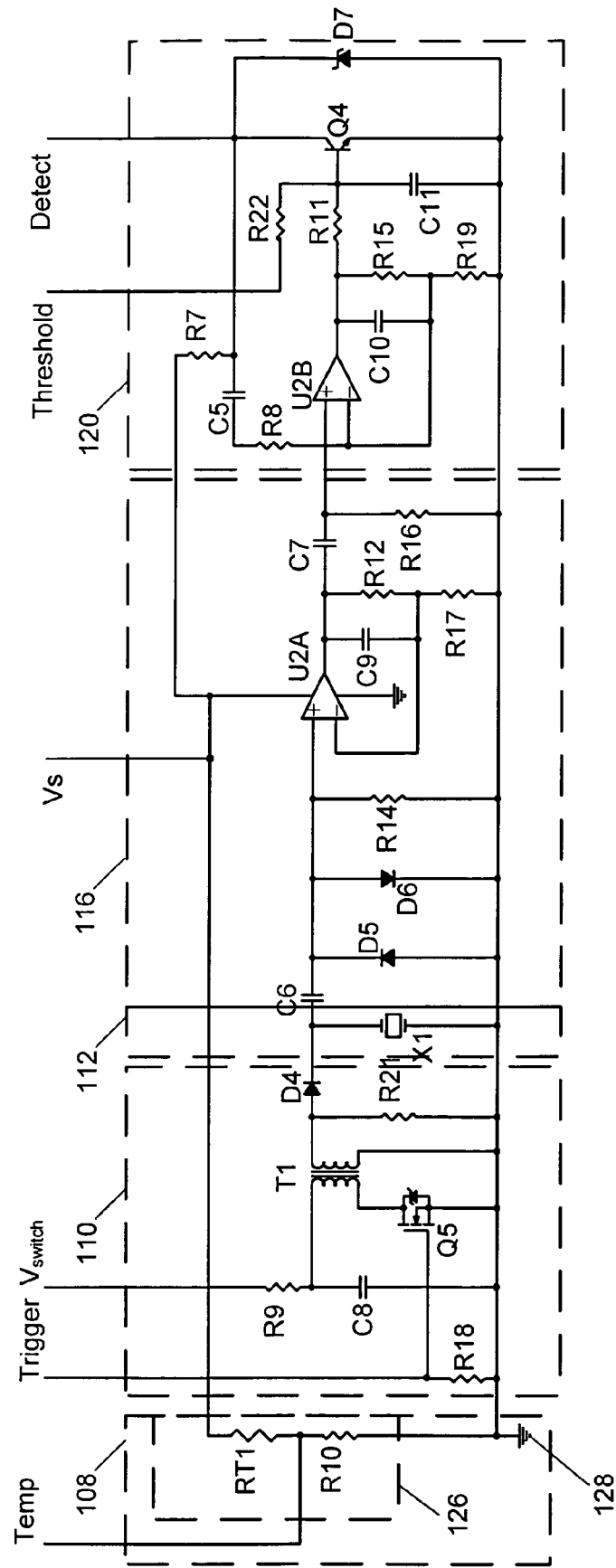
FIG. 2 shows a driving module.

FIG. 2 shows an embodiment of the driving module 110 (like parts in FIGS. 1 and 2 are referenced with like numerals). Since a change of temperature leads to a change of the speed of sound in air, the processor 104 is provided temperature information so that the processor 104 can compensate for the change of temperature. The temperature compensation module 108 therefore includes a resistor R10 and a thermistor RT1. The resistor R10 and the thermistor RT1 form a voltage divider 126. The voltage divider 126 outputs a signal labeled "Temp." The resistance of the thermistor RT1 changes with changes in temperature. Thus, the Temp signal provides the processor 104 temperature information. The processor 104 can adjust its operating parameters to reflect the temperature changes. In some embodiments, the processor 104 retrieves its operating parameters from a look-up table stored in the processor 104 using the Temp signal as a reference.

The excitation module 110 receives a Trigger signal and a $V_{switch}$ signal from the processor 104 and the power supply 124, respectively. The $V_{switch}$ signal charges a capacitor C8 that, in turn, upon an application of the Trigger signal, activates a transistor Q5, thereby discharging the capacitor C8 through a step-up transformer T1. The step-up transformer T1 generates a series of voltage pulses of short duration that can excite a ceramic transducer X1. In some embodiments, the step-up transformer has a 25:1 turn ratio. The ceramic transducer X1 typically resonates and sends out a high frequency ultrasonic signal. In some embodiments, the ceramic transducer X1 resonates at 150 kHz. The high frequency ultrasonic signal is then echoed when the ultrasonic signal hits an object or a surface. The ceramic transducer X1 also detects the received ultrasonic echo signal and converts the received ultrasonic echo signal into an electrical voltage which is detected by the amplifier module 116. The amplifier module 116 generally includes some clamping diodes such as diodes D5 and D6, and an amplifier U2A that amplifies the echo signal. The amplified signal and a threshold signal from the processor 104 are then fed to the demodulating module 120. Particularly, the threshold signal adjusts the amplified signal to compensate for the sensitivity of a transistor Q4. When transistor Q4 is activated, a demodulated signal or a Detect signal is generated.

The Detect signal and the Temp signal can be fed to the processor 104 for further processing. Based on the demodulated Detect signal and the Temp signal, the processor 104 generates a modulated $V_{control}$ signal that has a duty cycle that is based on the demodulated Detect signal. The modulated $V_{control}$ signal is fed to the power supply 124. In some embodiments, the modulated $V_{control}$ signal is a pulse-width-modulated ("PWM") signal. The duty cycles vary from about 20 percent to about 80 percent depending on a fluid level detected. For example, in some embodiments, the processor 104 will generate a PWM signal with a 20 percent duty cycle for an empty level, and an 80 percent duty cycle for a full level. The duty cycle of the modulated signal can be linearly dependent on the fluid level detected, can be nonlinearly dependent on the fluid level detected, and can be both linearly and nonlinearly dependent on the fluid level detected. In some embodiments, the duty cycles of the modulated signal are stored in the memory of the processor 104.

Figure 3:
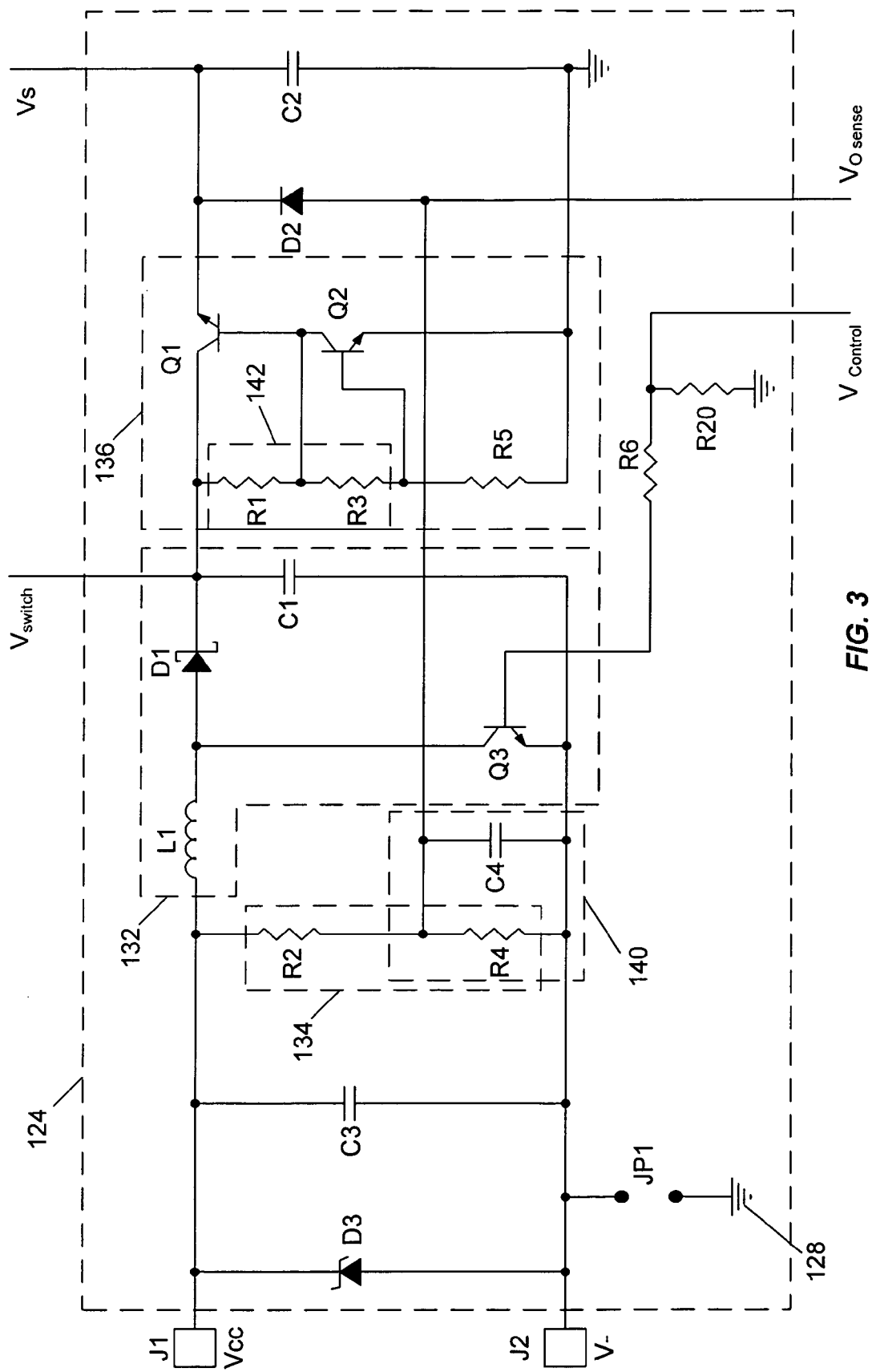
FIG. 3 shows a power supply circuit.

FIG. 3 shows an embodiment of the power supply 124. The power supply 124 generally includes two terminals or jumper connections J1, J2 for connecting the system 100 to an existing two-wire level gauge. An over-voltage protection diode D3 is connected in parallel to the jumper connections J1, J2. In addition, the power supply 124 also includes a DC-to-DC converting or flyback section 132. The flyback section 132 is coupled to a regulating section 136, both of which are detailed hereinafter. The modulated $V_{control}$ signal is received at a switch or a transistor Q3 of the flyback section. The flyback section 132 throws away, redistributes, or shunts at least a portion of the input current in J1 in proportion to the modulated $V_{control}$ signal to regulate the load (or voltage and current) across the jumper connections J1, J2. A filter, such as capacitor C3, reduces the ripple effect of the PWM signal that may appear at the jumper connections J1, J2. Parallel to the capacitor C3 is a second voltage divider 134 formed by resistors R2 and R4. The second voltage divider 134 is configured to maintain the voltage level provided to the processor 104 within some predetermined range. In some embodiments, the predetermined range is about 0 to 4 VDC.

In some embodiments, the flyback section 132 is also used to generate a power signal for the processor 104. For example, the flyback section 132 can provide a power signal $V_{switch}$ to the excitation module 110. The $V_{switch}$ signal initially has a voltage magnitude that is about equal to a voltage across the jumper connections J1, J2. This initial voltage may be referred to as a "low" voltage or state. When the $V_{control}$ signal increases or "turns high" during a PWM signal duty cycle, the transistor Q3 is turned on. When Q3 is on, it connects a passive element or an energy storage device (which is shown as inductor L1) to a ground 128. When Q3 is on, diode D1 prevents capacitor C1 from discharging to ground. The current may be built up nonlinearly or linearly with time at a rate that is approximately proportional to the voltage across the jumper connections J1, J2 or the gauge voltage divided by the value of the inductor L1. In such cases, the inductor L1 stores at least a portion of the energy of the gauge voltage. The transistor Q3 is generally kept on until the inductor L1 has been charged in an amount that exceeds a maximum current that the inductor L1 allows. In this way, the inductor L1 shunts the excess current through J2 enabling processor 104 to regulate current flow between the connectors J1 and J2 in proportion to the modulated signal, $V_{control}$. That is, the duty cycle of the modulated signal, $V_{control}$ can therefore be timed, or adjusted such that different amounts of current can be shunt to reflect a variable resistance emulated by the two-wire sensor system 100 at the connectors J1 and J2. For example, when relatively large amounts of current are being shunt by the two-wire sensor, the system 100 emulates a relatively low resistance. When lower or less amounts of current are being shunt by the two-wire sensor, the system 100 emulates a higher or increased resistance.

When the $V_{control}$ signal turns low during a PWM signal duty cycle, the transistor Q3 is turned off. When Q3 is off, the connection between inductor L1 and ground is severed. Thus, the voltage across the inductor L1 forward biases the diode D1 and current travels through the diode D1. In some embodiments, the value of the capacitor C1 is selected to be relatively large when compared to the rate of change of voltage across the diode D1. As a consequence, the $V_{switch}$ signal remains relatively constant.

The flyback section 132 also generates a $V_{O\ sense}$ signal using the voltage divider 134 and an RC filter 140, which includes resistor R4 and capacitor C4. In some embodiments, the $V_{O\ sense}$ signal is an output signal from the power supply 124 that can be fed to the processor 104 to regulate the output voltage, which then controls the PWM duty cycle. In some other embodiments, the $V_{O\ sense}$ signal can be used to detect failure conditions such as a condition where the jumper connections J1, J2 have been wired to a battery instead of a fuel or similar gauge.

The regulating section 136 generally includes a second switch that also includes transistors Q1 and Q2, and a voltage divider 142 that includes resistors R1, R3, and R5. The regulating section 136 uses the second switch or the transistor pair Q1 and Q2 to regulate the output of the capacitor C1 to provide a second power signal $V_S$ to the processor 104. Diode D2 is configured to prevent any large voltage or current discrepancies from damaging the processor 104. If there are any voltage or current spikes in the power signal from the level gauge, the diode D2 clamps or clips the spikes. Capacitor C2 is a second energy storage charged by the $V_S$ signal. In this way, energy stored in the capacitor C2 can be provided to the processor 104 when the processor 104 needs additional energy during any switching process. Furthermore, the $V_S$ signal is also used to power the amplifier module 116, the temperature compensation module 108, and the demodulating module 120.

Although the embodiments discussed relate the two-wire sensor system 100 to sensing fluid level in a container, the two-wire sensor system 100 can also be applied to other types of sensing. In general, the two-wire sensor system 100 can be used to measure distances between one point and a surface. For example, when the two-wire sensor system 100 is installed near a suspension of a vehicle, the two-wire sensor system 100 can be used to measure a clearance distance or height between the suspension and a chassis of the vehicle. For another example, when the two-wire sensor system 100 is positioned near the bottom of a chassis of the vehicle, the two-wire sensor system 100 can be used to measure a clearance of the vehicle relative to a road surface. Numerous other applications are possible and, in general, the two-wire sensor system 100 can be configured to provide a distance measurement when needed or desired.

Various features and advantages of the invention are set forth in the following claims.

The invention claimed is:

1. A circuit having two terminals, the two terminals configured to receive an input current, the circuit comprising:
a sensor;
a controller coupled to the sensor, and configured to generate a modulated signal; and
a flyback circuit coupled to the controller to receive the modulated signal, and operable to generate a first output voltage based on the modulated signal, to shunt at least a portion of the input current, and to enable the controller to regulate the input current in proportion to the modulated signal.

2. The circuit of claim 1, wherein the sensor comprises an ultrasonic sensor.

3. The circuit of claim 1, wherein the flyback circuit comprises at least one of a transistor configured to receive the modulated signal, an inductor configured to generate a portion of the first output voltage supplied to the sensor, and a capacitor configured to generate a second portion of the first output voltage supplied to the sensor.

4. The circuit of claim 1, further comprising a regulator configured to produce a second output voltage based on the first output voltage, and to power the controller with the second output voltage.

5. The circuit of claim 1, wherein the modulated signal comprises a pulse-width-modulated signal.

6. The circuit of claim 1, further comprising a temperature compensating element configured to sense a temperature change and to supply the sensed temperature change to the controller.

7. The circuit of claim 1, further comprising a filtering element configured to filter ripples generated by the flyback circuit.

8. A circuit having two terminals, the circuit comprising:
a means for receiving a current signal;
a means for sensing a condition indicative of a distance;
a means for generating a modulated signal from the condition indicative of the distance; and
a means for shunting at least a portion of the current signal, for enabling the means for generating the modulated signal to regulate the current signal in proportion to the modulated signal.

9. The circuit of claim 8, further comprising a means for regulating the current signal, and for providing the regulated current signal based on the modulated signal.

10. The circuit of claim 8, wherein the means for shunting at least a portion of the current signal comprises a means for switching and for being activated by the modulated signal.

11. The circuit of claim 8, wherein the means for sensing comprises an ultrasonic sensor.

12. The circuit of claim 8, wherein the means for receiving a current signal further comprises two terminals configured to receive the current signal.

13. The circuit of claim 8, wherein the modulated signal comprises a pulse-width-modulated signal.

14. The circuit of claim 8, further comprising a means for supplying a temperature compensating value to the means for generating a modulated signal.

15. The circuit of claim 8, further comprising a means for filtering ripples generated by the means for receiving.

16. A method of emulating a two-wire resistive sensor, the two-wire resistive sensor having two terminals and a processor, the method comprising:
receiving a current signal at the two terminals;
generating a modulated signal at the processor;
shunting at least a portion of the current signal; and
regulating the current signal in proportion to the modulated signal.

17. The method of claim 16, further comprising:
generating a voltage signal in response to the modulated signal; and
providing the voltage signal to a sensor.

18. The method of claim 16, wherein the processor is coupled to a flyback circuit, the method further comprising powering the processor with the flyback circuit based on the modulated signal.

19. The method of claim 16, wherein the processor is coupled to a flyback circuit, the method further comprising powering the processor through a diode.

20. The method of claim 16, wherein the two-wire resistive sensor further comprises an ultrasonic sensor.

21. The method of claim 16, wherein the processor is powered by a first voltage signal, the method further comprising powering a sensor with a second voltage signal that is based on the first voltage signal.

22. The method of claim 16, wherein the modulated signal comprises a pulse-width-modulated signal.

23. The method of claim 16, further comprising:
sensing a temperature; and
supplying a sensed temperature signal to the processor.

24. The method of claim 16, further comprising filtering the voltage signal.

25. A method of emulating a two-wire resistive sensor, the two-wire resistive sensor having two terminals, the two terminals receiving an input current, the method comprising:
sensing a distance;
generating a modulated signal based on the distance;
redistributing at least a portion of the input current based on the modulated signal; and
regulating the input current in proportion to the modulated signal.

26. The method of claim 25, wherein the two-wire resistive sensor further comprises a flyback circuit and a controller, wherein the flyback circuit shunts at least a portion of the input current, and wherein the controller generates the modulated signal, the method further comprising:
   generating at the flyback circuit a first voltage signal; and
   powering the controller with the first voltage signal.

27. The method of claim 26, wherein generating the first voltage signal comprises activating a transistor with the modulated signal.

28. The method of claim 25, wherein generating the first voltage signal comprises outputting the first voltage signal through a diode.

29. The method of claim 25, wherein sensing the distance comprises sensing with an ultrasonic sensor.

30. The method of claim 25, wherein the modulated signal comprises a pulse-width-modulated signal.

31. The method of claim 25, wherein the distance comprises at least one of a fluid level and a distance between two surfaces.

32. A circuit comprising:
   a sensor;
   a controller coupled to the sensor, and configured to generate a modulated signal;
   a flyback circuit coupled to the controller to receive the modulated signal, and operable to generate a first output voltage based on the modulated signal, and to power the sensor with the first output voltage; and
   a regulator configured to produce a second output voltage based on the first output voltage, and to power the controller with the second output voltage.

33. The circuit of claim 32, wherein the sensor comprises an ultrasonic sensor.

34. The circuit of claim 32, wherein the flyback circuit comprises at least one of a transistor configured to receive the modulated signal, an inductor configured to generate a portion of the first output voltage supplied to the sensor, and a capacitor configured to generate a second portion of the first output voltage supplied to the sensor.

35. The circuit of claim 32, further comprising two power inputs configured to receive a gauge power.

36. The circuit of claim 32, wherein the modulated signal comprises a pulse-width-modulated signal.

37. The circuit of claim 32, further comprising a temperature compensating element configured to sense a temperature change and to supply the sensed temperature change to the controller.

38. The circuit of claim 32, further comprising a filtering element configured to filter ripples generated by the flyback circuit.

* * * * *